United States Patent
Van Kleef (10) Patent No.: US 10,337,675 B2
(45) Date of Patent: Jul. 2, 2019

(54) INSECT CONTROL LIGHTING DEVICE

(71) Applicant: Paul Van Kleef, Los Angeles, CA (US)

(72) Inventor: Paul Van Kleef, Los Angeles, CA (US)

(73) Assignee: Clean Concept LLC, Vernon, CA (US)

( * ) Notice: Subject to any disclaimer, the term of this patent is extended or adjusted under 35 U.S.C. 154(b) by 7 days.

(21) Appl. No.: 15/355,883

(22) Filed: Nov. 18, 2016

(65) Prior Publication Data
US 2018/0116196 A1    May 3, 2018

Related U.S. Application Data (60) Provisional application No. 62/415,153, filed on Oct. 31, 2016.

(51) Int. Cl.
| | |
|---|---|
| *A01M 1/02* | (2006.01) |
| *A01M 1/10* | (2006.01) |
| *A01M 1/14* | (2006.01) |
| *F21V 23/06* | (2006.01) |
| *F21K 9/23* | (2016.01) |
| *F21V 23/00* | (2015.01) |
| *F21Y 115/10* | (2016.01) |

(52) U.S. Cl.
CPC ............. *F21K 9/23* (2016.08); *A01M 1/02* (2013.01); *A01M 1/106* (2013.01); *A01M 1/145* (2013.01); *F21V 23/004* (2013.01); *F21V 23/06* (2013.01); *F21Y 2115/10* (2016.08)

(58) Field of Classification Search
CPC .......... A01M 1/02; A01M 1/04; A01M 1/016; A01M 1/14; A01M 1/145; F21K 9/23; F21K 9/232; F21K 9/233; F21K 9/237
USPC ................. 362/398; 239/45; 340/573.2; 43/112–114
See application file for complete search history.

(56) References Cited

U.S. PATENT DOCUMENTS

| | | | | |
|---|---|---|---|---|
| 1,962,420 A | * | 6/1934 | Bradley ................. | A01M 1/04 43/112 |
| 2,132,371 A | * | 10/1938 | Kriwat .................. | A01M 1/02 43/112 |
| 2,468,227 A | * | 4/1949 | Nagel .................... | A01M 1/02 43/113 |
| 2,608,022 A | * | 8/1952 | Wright ................... | A01M 1/04 362/253 |
| 2,674,682 A | * | 4/1954 | Hanson .................. | A01M 1/04 219/201 |

(Continued)

FOREIGN PATENT DOCUMENTS

| | | | | |
|---|---|---|---|---|
| CA | 2993968 A1 | * | 11/2016 | ............. F21V 23/06 |
| EP | 2730841 A1 | * | 5/2014 | ........... F21V 21/096 |

(Continued)

*Primary Examiner* — Magdalena Topolski
*Assistant Examiner* — Morgan T Barlow
(74) *Attorney, Agent, or Firm* — Kelley Drye & Warren LLP (57) ABSTRACT

An insect control lighting device having a connector capable of electrically connecting to a common lightbulb socket or electrical outlet. The lighting device includes one or more light sources in electrical connection with the connector. The lighting device further includes an inner module having one or more insect control materials, such an insect attractant and an adhesive. The inner module may be secured within the lighting device by a magnet or by screw threads at one or both ends of the inner module.

14 Claims, 9 Drawing Sheets

(56) References Cited

U.S. PATENT DOCUMENTS

| | | | | |
|---|---|---|---|---|
| 2,791,864 A | * | 5/1957 | Chappell | A01M 1/04 43/113 |
| 2,873,551 A | * | 2/1959 | Misko | A01M 1/10 43/111 |
| 3,148,398 A | * | 9/1964 | Thomas, Jr. | A47L 25/005 15/104.002 |
| 3,243,913 A | * | 4/1966 | Carriero | A01M 1/04 43/98 |
| 3,321,862 A | * | 5/1967 | Peek | A01M 1/04 313/238 |
| 3,465,468 A | * | 9/1969 | Takamoto | A01M 1/04 43/113 |
| 3,516,697 A | * | 6/1970 | Hahn | F21V 3/061 |
| 4,498,420 A | * | 2/1985 | Botterman | A01M 1/12 |
| 4,577,434 A | * | 3/1986 | Davis | A01M 1/145 43/114 |
| 4,785,573 A | * | 11/1988 | Millard | A01M 1/04 362/179 |
| 4,852,296 A | * | 8/1989 | Swanson | A01M 1/04 43/112 |
| 4,951,414 A | * | 8/1990 | Mewissen | A01M 1/04 43/112 |
| 5,020,270 A | * | 6/1991 | Lo | A01M 1/08 43/112 |
| 5,048,224 A | * | 9/1991 | Frisch | A01M 1/14 43/107 |
| 5,203,816 A | * | 4/1993 | Townsend | A01M 1/145 43/113 |
| 5,231,790 A | * | 8/1993 | Dryden | A01M 1/145 43/113 |
| 5,390,096 A | * | 2/1995 | DeKleine | F21S 8/02 315/56 |
| 5,513,465 A | * | 5/1996 | Demarest | A01M 1/145 43/113 |
| 5,608,987 A | * | 3/1997 | Meyer | A01M 1/145 43/113 |
| 5,771,628 A | * | 6/1998 | Nobbs | A01M 1/14 43/121 |
| 5,974,727 A | * | 11/1999 | Gilbert | A01M 1/145 43/113 |
| 6,195,932 B1 | * | 3/2001 | Aicher | A01M 1/04 43/112 |
| 6,406,673 B1 | * | 6/2002 | Soller | A01M 1/2066 422/125 |
| 6,481,152 B1 | * | 11/2002 | Gray | A01M 1/145 43/113 |
| 6,502,347 B1 | * | 1/2003 | Carver, Sr. | A01M 1/04 43/113 |
| 6,618,984 B1 | * | 9/2003 | Li | A01M 1/04 43/107 |
| 6,758,009 B1 | * | 7/2004 | Warner | A01M 1/145 43/113 |
| 6,788,541 B1 | * | 9/2004 | Hsiung | G09F 9/33 257/713 |
| 6,817,139 B1 | * | 11/2004 | Powell | A01M 1/08 43/113 |
| 6,959,510 B1 | * | 11/2005 | Nelson | A01M 1/04 43/113 |
| 7,246,919 B2 | * | 7/2007 | Porchia | A61L 9/03 362/253 |
| 7,412,797 B1 | * | 8/2008 | Hiscox | A01M 1/02 43/107 |
| 7,905,626 B2 | * | 3/2011 | Shantha | H01J 5/54 362/228 |
| 7,987,630 B2 | * | 8/2011 | Cink | A01M 1/2011 43/132.1 |
| 8,079,175 B2 | * | 12/2011 | Calkins | A01M 1/145 43/113 |
| 8,319,649 B1 | * | 11/2012 | Devane | A01M 1/026 340/552 |
| 8,424,239 B1 | * | 4/2013 | Gallo | A01M 1/223 43/112 |
| 8,677,677 B2 | * | 3/2014 | Schneidmiller | F21S 8/02 315/56 |
| 9,506,634 B1 | * | 11/2016 | Ellis | F24F 13/00 |
| 9,968,080 B1 | * | 5/2018 | Van Kleef | A01M 1/145 |
| 2003/0000126 A1 | * | 1/2003 | Lenz | A01M 1/023 43/112 |
| 2003/0070346 A1 | * | 4/2003 | Winner | A01M 1/023 43/112 |
| 2004/0160199 A1 | * | 8/2004 | Morgan | A01M 1/04 315/312 |
| 2005/0082296 A1 | * | 4/2005 | Pfister | A01M 1/04 43/112 |
| 2006/0076672 A1 | * | 4/2006 | Petroski | F21K 9/00 257/706 |
| 2006/0123694 A1 | * | 6/2006 | Welch | A01M 1/02 43/113 |
| 2006/0236592 A1 | * | 10/2006 | Hall, Jr. | A01M 1/106 43/122 |
| 2006/0266292 A1 | * | 11/2006 | Duckworth | A01M 1/04 43/113 |
| 2007/0151142 A1 | * | 7/2007 | Suteerawanit | A01M 1/106 43/122 |
| 2008/0198610 A1 | * | 8/2008 | Genenbacher | F21V 19/0005 362/398 |
| 2009/0045715 A1 | * | 2/2009 | Shantha | H01J 5/54 313/51 |
| 2009/0100742 A1 | * | 4/2009 | Cilek | A01M 1/02 43/107 |
| 2009/0188155 A1 | * | 7/2009 | Tolley | A01M 1/026 43/131 |
| 2009/0262535 A1 | * | 10/2009 | Maillet-Jegou | A01M 1/145 362/253 |
| 2009/0277073 A1 | * | 11/2009 | Chen | A01M 1/04 43/112 |
| 2009/0293341 A1 | * | 12/2009 | Fleming | A01M 1/04 43/113 |
| 2010/0050499 A1 | * | 3/2010 | Liang | A01M 1/106 43/113 |
| 2010/0058646 A1 | * | 3/2010 | Scholz | A01M 1/04 43/112 |
| 2010/0117552 A1 | * | 5/2010 | Lee | H01R 33/90 315/287 |
| 2010/0236133 A1 | * | 9/2010 | Frisch | A01M 1/145 43/113 |
| 2010/0290240 A1 | * | 11/2010 | Genenbacher | F21V 19/0005 362/398 |
| 2011/0110073 A1 | * | 5/2011 | Schnuckle | F21S 10/04 362/96 |
| 2011/0127914 A1 | * | 6/2011 | Patton | F21S 10/04 315/76 |
| 2012/0025235 A1 | * | 2/2012 | Van De Ven | H01L 33/52 257/98 |
| 2012/0085020 A1 | * | 4/2012 | Cink | A01M 1/023 43/107 |
| 2012/0167450 A1 | * | 7/2012 | Frisch | A01M 1/145 43/113 |
| 2012/0180379 A1 | * | 7/2012 | Tien | A01M 1/02 43/112 |
| 2012/0297662 A1 | * | 11/2012 | Strube | A01M 1/145 43/113 |
| 2013/0043781 A1 | * | 2/2013 | Wang | F21V 21/096 313/46 |
| 2013/0152452 A1 | * | 6/2013 | Lazzarini | A01M 1/02 43/114 |
| 2013/0176750 A1 | * | 7/2013 | Ray | F21V 23/06 362/647 |
| 2013/0242580 A1 | * | 9/2013 | Stephany | F21V 21/14 362/427 |
| 2013/0298444 A1 | * | 11/2013 | Strube | A01M 1/145 43/113 |
| 2013/0322071 A1 | * | 12/2013 | Chang | F21V 21/00 362/235 |
| 2014/0049963 A1 | * | 2/2014 | McGuire | F21V 19/04 362/249.01 |
| 2014/0049972 A1 | * | 2/2014 | McGuire | F21V 21/00 362/427 |

(56) References Cited

U.S. PATENT DOCUMENTS

| | | | |
|---|---|---|---|
| 2014/0056028 A1* | 2/2014 | Nichol | G02B 6/0028 362/611 |
| 2014/0099801 A1* | 4/2014 | Liao | H01R 13/6205 439/39 |
| 2014/0146545 A1* | 5/2014 | Shum | F21V 17/105 362/311.02 |
| 2014/0259879 A1* | 9/2014 | Logsdon | A01M 1/2011 43/114 |
| 2014/0265905 A1* | 9/2014 | Ray | F21S 9/02 315/210 |
| 2014/0352200 A1* | 12/2014 | Tremble | A01M 1/04 43/112 |
| 2015/0020437 A1* | 1/2015 | Crawley | A01M 1/2016 43/113 |
| 2015/0048759 A1* | 2/2015 | Jo | F21V 29/83 315/297 |
| 2015/0049461 A1* | 2/2015 | Yotsumoto | F21V 33/0056 362/86 |
| 2015/0049490 A1* | 2/2015 | Barnetson | F21V 23/006 362/311.02 |
| 2015/0062892 A1* | 3/2015 | Krames | F21V 15/01 362/231 |
| 2015/0070895 A1* | 3/2015 | Yotsumoto | F21V 3/02 362/253 |
| 2015/0075060 A1* | 3/2015 | Balsam | A01M 1/026 43/123 |
| 2015/0077983 A1* | 3/2015 | Pan | F21V 21/096 362/218 |
| 2016/0000060 A1* | 1/2016 | Sandford | A01M 1/02 43/113 |
| 2016/0079701 A1* | 3/2016 | Liao | H01R 33/94 439/39 |
| 2016/0102855 A1* | 4/2016 | Kowalchuk | F21V 33/0004 362/154 |
| 2017/0055513 A1* | 3/2017 | Darnell | A01M 1/12 |
| 2017/0071184 A1* | 3/2017 | Zheng | A01M 1/10 43/111 |
| 2017/0367314 A1* | 12/2017 | Billingsley, Jr. | F21V 3/061 |
| 2018/0116195 A1* | 5/2018 | Zhang | F21V 19/005 |
| 2018/0199563 A1* | 7/2018 | Zheng | A01M 1/223 |

FOREIGN PATENT DOCUMENTS

| | | | |
|---|---|---|---|
| JP | 06245676 A * | 9/1994 | F21S 8/02 |
| JP | WO 2013014760 A1 * | 1/2013 | A01M 1/04 |
| WO | WO 2013076603 A1 * | 5/2013 | F21V 21/02 |
| WO | WO 2015164849 A1 * | 10/2015 | A01M 1/023 |
| WO | WO-2017027859 A1 * | 2/2017 | F21S 8/02 |

\* cited by examiner

INSECT CONTROL LIGHTING DEVICE

CROSS-REFERENCE TO RELATED APPLICATIONS

This application claims the benefit of U.S. Provisional Patent Application No. 62/415,153, filed Oct. 31, 2016. The entire contents of that application are incorporated herein by reference.

FIELD OF THE INVENTION

This invention relates to the field of insect control and, more particularly, to a lighting device with an inner insect control module.

BACKGROUND OF THE INVENTION

Various means exist for controlling insects in or around the home. For example, adhesive strips, sometimes referred to as "fly paper" may be used to attract and eradicate insects. Insects may be attracted to an insect attractant applied to the paper, and when the insects land on the paper, an adhesive ensures that the insects remains stuck to the paper. Because insects cannot separate themselves from the paper, they ultimately die of thirst, hunger, or age. Handling fly paper, however, may be difficult because the adhesive is typically very strong and may inadvertently attach itself to the person installing the fly paper. Also, the fly paper may need to be installed away from where persons are expected to walk so that the fly paper does not accidentally adhere to people or pets. However, placing the fly paper in a remote location may not adequately attract and eradicate insects.

Another means for addressing insects is by candles, such as Citronella candles. The candles emit a scent that is considered an insect repellant. However, candles are a potential fire hazard and often produce unwanted smoke and wax drippings.

Other existing devices for attracting and killing insects, sometimes referred to as "bug zappers," typically include a light source surrounded by high-voltage, electrically charged metal elements. Many flying insects, including mosquitos are drawn to lights, and insects are electrocuted when they make contact with the charged elements. Some bug zappers need to be placed on the floor or another flat surface and may be accidentally contacted by persons or pets passing near the bug zapper. Some bug zappers may be suspended from a post or a ceiling. However, mounting the bug zappers can be difficult and/or time consuming. Also, bug zappers typically need to be plugged into an electric socket, further complicating installation.

Some existing lighting devices are capable of connecting to lightbulb sockets and emitting insect control material. For example, U.S. Pat. No. 7,246,919, issued to Porchia et al., discloses a screw-in lightbulb with a dispenser that may be used to evaporate and emit fragrances and other active ingredients, including an insect control substance such as an insecticide or insect attractant. However, the active ingredient dispenser is contained within the base and is not placed in proximity to the light sources and/or used with an adhesive chemical to eradicate insects.

There is therefore a need for improvements in insect control devices that overcome some or all of the previously described drawbacks of prior insect control options.

SUMMARY OF THE INVENTION

The present invention is directed to improved devices for insect control.

This invention describes a lighting device having a housing and an inner module inserted within the housing of the device. The housing of the device has one or more light sources that may emit light in the visible spectrum, infra-red spectrum, and/or the ultraviolet spectrum. The spectrum of light may be chosen to attract or repel insects.

The inner module may be held within the housing by one or more magnets or screw threads that mate the inner module to the housing. The inner module may include insect control material, such as an insect attractant, an insect, repellant, and/or an adhesive. The inner module may be removed from the housing and replaced with a new inner module. The inner module may be replaced, for example, when the insect control material has evaporated and is no longer effective, or when a number of insect have adhered to an adhesive on the inner module.

Numerous variations may be practiced in the preferred embodiment.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems, methods, and apparati for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DETAILED DESCRIPTION OF THE INVENTION

The invention may be understood more readily by reference to the following detailed description of a preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Figure 1:
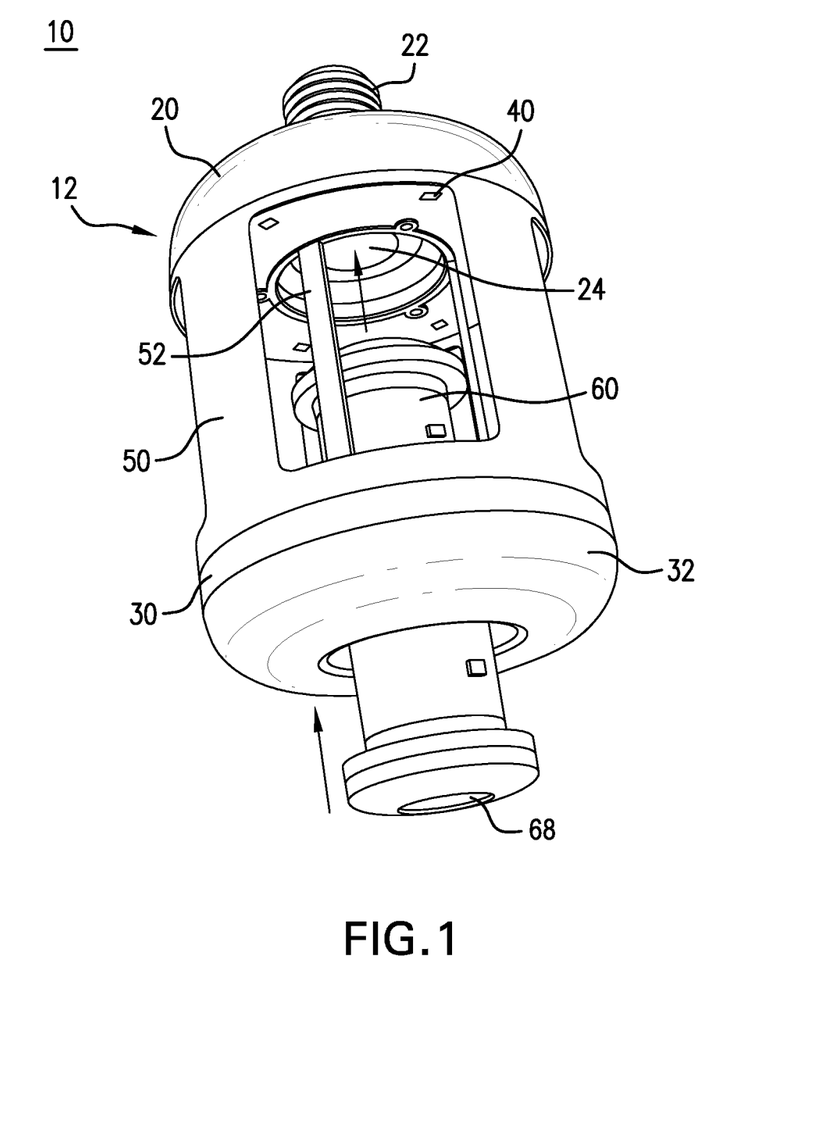
FIG. 1 depicts a perspective view of an embodiment of the invention.

Referring to FIG. 1, there is shown an embodiment of an insect control lighting device (10) in accordance with the present invention. Lighting device (10) includes a housing having a first end (20) and a second end (30) connected by a first set of one or more pillars (50), forming an open, central region of housing (12). Housing (12) is further depicted in FIG. 2.

Figure 2:
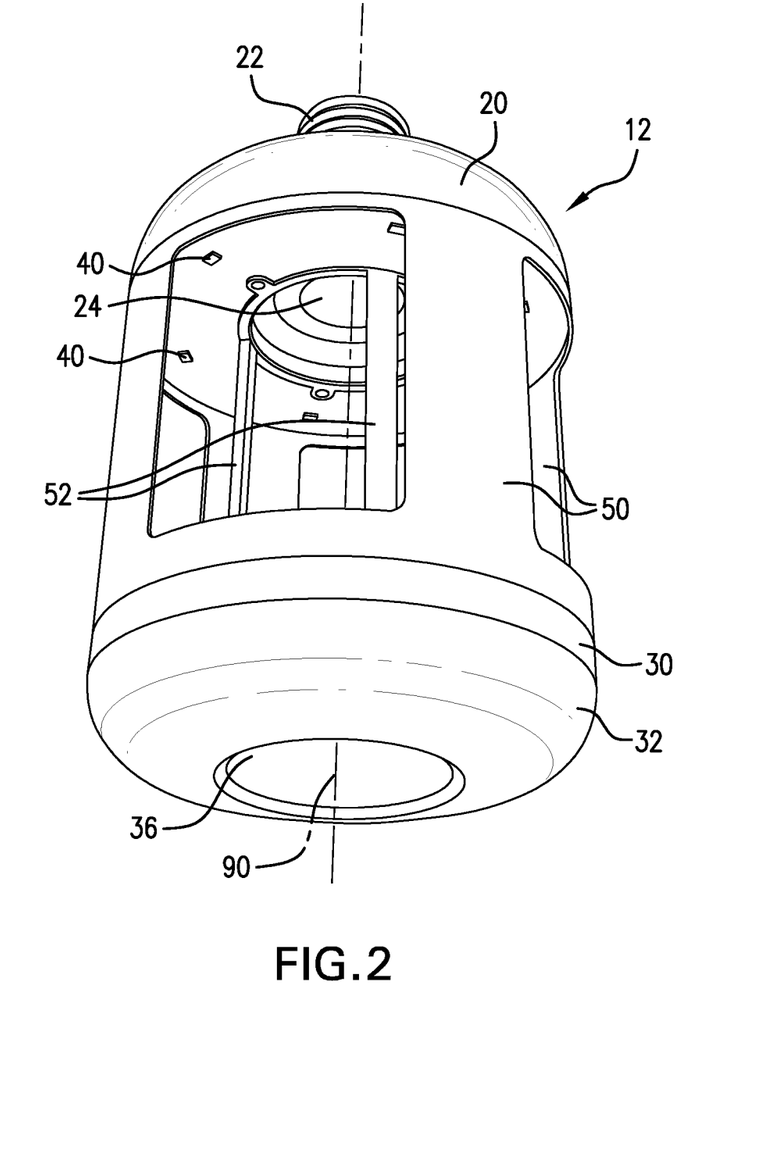
FIG. 2 depicts a perspective view of the housing shown in FIG. 1.

First end (20) and second end (30) may have a generally circular profile. First end (20) and second end (30) may be aligned along a center axis (90) that passes through the center of first end (20) and the center of second end (30). First set of pillars (50) may be arranged to connect the first end (20) and second end (30) at or near their outer circumference. In addition or in the alternative, a second set of pillars (52) may connect first end (20) and second end (30) and be situated within the outer circumference of first end (20) and second end (30). Preferably, however, second set of pillars (52) may be arranged equidistant from center axis (90).

Figure 3:
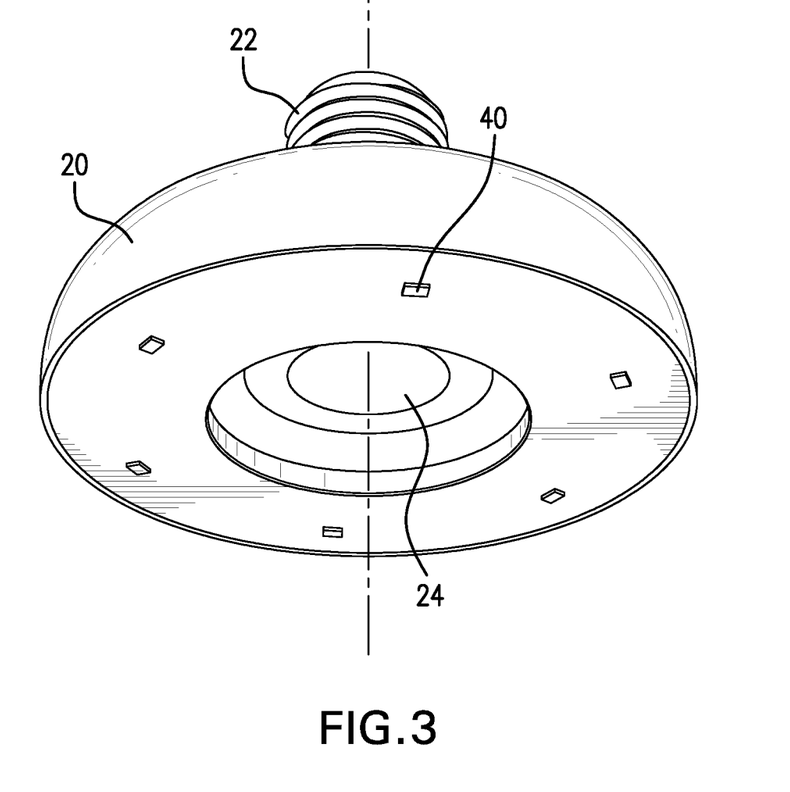
FIG. 3 depicts a perspective view of the first end of the housing shown in FIG. 2.

A perspective view of first end (20) is shown in FIG. 3. A lightbulb connector (22) may be attached to first end (20). Preferably, connector (22) may be attached to the top surface of first end (20), and the center axis of connector (22) may be aligned with center axis of first end (20). Connector (22) may be any connector capable of mating with a power source, such as a lightbulb socket or an electrical outlet. Preferably, connector (22) is an E27 lightbulb screw base. In the alternative or in addition, lighting device (10) may have a battery compartment for batteries (not shown) that may be used to power lighting device (10). A battery compartment may, for example, be located within first end (20) or second end (30). The battery compartment may be similarly structured to battery compartments typically found in common consumer electronic devices. The batteries may be replaceable by accessing the batteries via a battery compartment door.

First end (20) may further include one or more magnets (24). As shown in FIG. 3, the one or more magnets may be preferably aligned with the center axis of first end (20). Also, as shown in FIG. 3, the one or more magnets may be located within a recess at the bottom surface of first end (20). In the alternative, first end (20) may have a flat bottom surface and one or more magnets (24) attached to the bottom surface.

First end (20) and/or the second end (30) may include one or more light sources (40). Light sources (40) may include, for example, light emitting diodes (LEDs). One or more light sources (40) may be capable of emitting light in the ultraviolet or infrared spectrum. In addition or in the alternative, one or more light sources (40) may be capable of emitting one or more colors in the visible light spectrum. Each light source (40) may be connected to and receive power from connector (22) and/or batteries in a battery compartment within housing (12).

Figure 4:
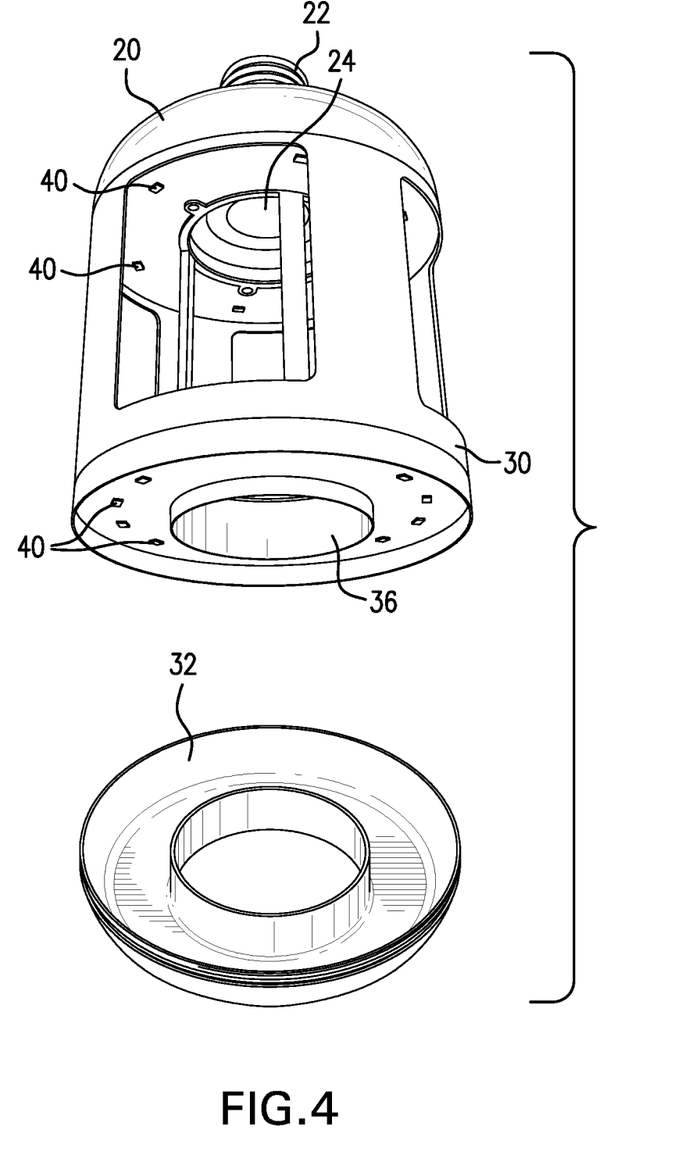
FIG. 4 depicts a perspective view of the housing with a light source cover removed.

As depicted in FIG. 4, second end (30) may include a cover (32). The cover may be translucent or transparent to allow light emitted from light source (40) in the second end (30) to pass through cover (32). The type of light sources (40) and the spectrum(s) of light emitted from light sources (40) in first end (20) may be the same type of light sources and spectrum of light emitted from light sources (40) in second end (30), or the light sources and/or spectrums of light emitted may be different between or within each end (20), (30). As shown in FIGS. 2 and 4, second end (30) may have an aperture (36) leading to the open, center region of housing (12), between first end (20) and second end (30).

Lighting device (10) may further include one or more circuit boards electrically connected to the light sources, and electrically connected to the connector and/or the batteries. The circuit board may be used to control the illumination of light sources (40). The circuit boards may control, for example, the brightness of one or more light sources (40) and/or the spectrum of light emitted by one or more light sources (40). Each circuit board may be contained within first end (20) or second end (30) of lighting device (10).

Figure 5A:
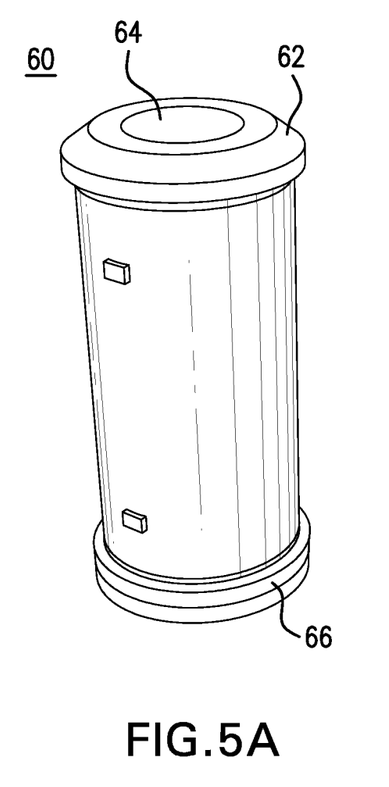
FIGS. 5A and 5B depict an example of an inner module.
Figure 5B:
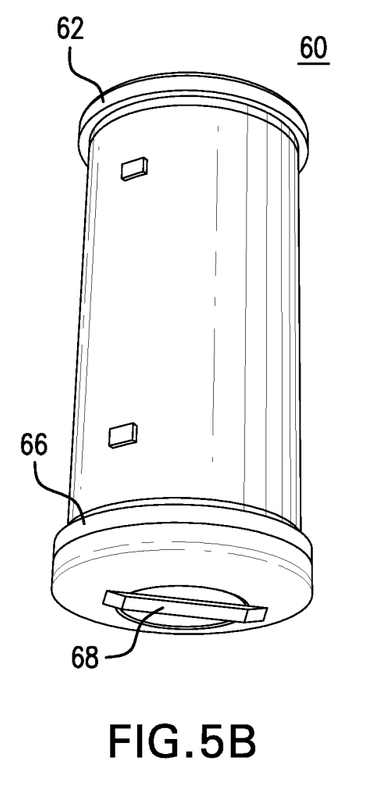
Figure 6:
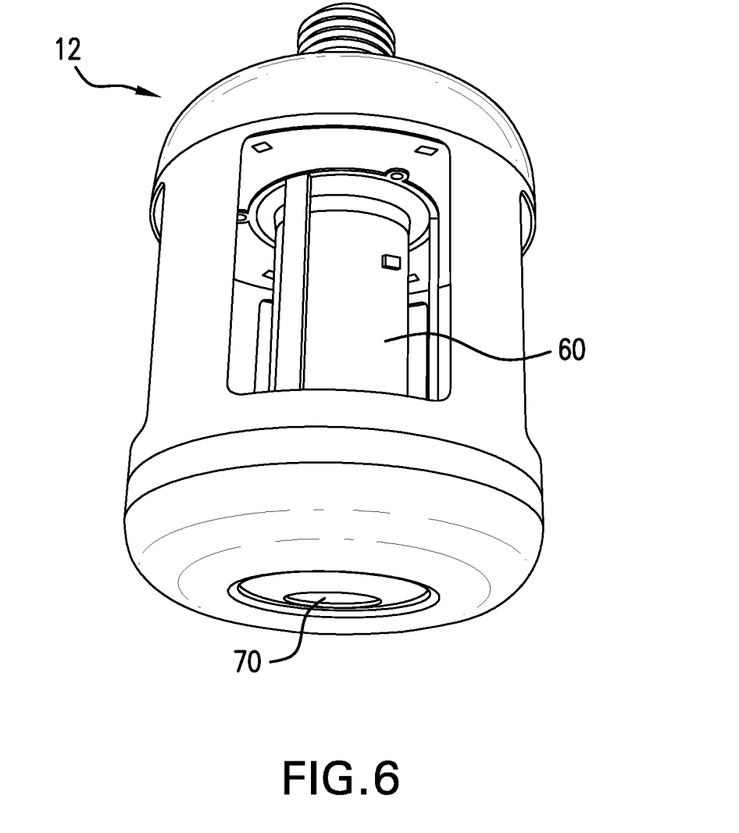
FIG. 6 depicts an inner module inserted into a housing.

The lighting device (10) may further include inner module (60). As show in FIGS. 5A and 5B, inner module (60) may have a proximal end (62) and a distal end (66). Proximal end (62) may have a magnet (64) at or near the surface. Magnet (64) may be magnetically attracted to magnet (24) in first end (20) of housing (12). The proximal end of inner module (60) may be inserted through the aperture (36) in second end (30). As shown in FIG. 6, inner module (60) may be fully inserted into housing (12) so that, for example, the distal end (66) or inner module (60) is situated within aperture (36) of second end (30). In the alternative, or a portion of inner module (60) may remain outside housing (12) when inner module (60) is fully inserted, or distal end (66) of inner module (60) may be located some distance into housing (12) when inner module (60) is fully inserted into housing (12). Inner module (60) is shown in FIG. 1 as partly inserted into housing (12). The arrows in FIG. 1 indicate the direction in which inner module (60) may be inserted into housing (12).

Preferably, inner module (60) may be inserted into housing (12) to the point where magnet (24) and magnet (64) are in sufficiently close proximity to each other to create an attraction between magnet (24) and magnet (64) strong enough to prevent inner module (60) from falling out of housing (12) when first end (20) of housing (12) is oriented directly above second end (30) of housing (12), or when proximal end (62) of inner module (60) is oriented directly above distal end (66) of inner module (60).

In the alternative, magnet (24) in first end (20) of housing (12), or magnet (64) at proximal end (62) of inner module (60) may be replaced by a metal attracted to a magnet (ferromagnetic). Preferably, the strength of the magnet and the size of the ferromagnetic material would be sufficient to prevent inner module (60) from falling when housing (12) and/or inner module (60) catch tube are oriented as described in the preceding paragraph.

The distal end (66) of inner module (60) may have a handle (68), a hole (70) (see FIG. 6), a notch, or other means for gripping distal end (66) to facilitate removal of inner module (60) from housing (12). In addition or in the alternative, at distal end (66) may include one or more magnets magnetically attracted to magnet (24), to allow inner module (60) to be magnetically held within housing (12) as described above regardless of whether the proximal end (62) or the distal end (66) are inserted first into housing (12).

In the alternative, proximal end (62) and/or distal end (66) of inner module (60) may include screw threads (not shown) that are capable of mating with screw threads at first end (20) of housing (12) and/or within aperture (36), respectively. Inner module (60) may then be secured in housing (12) by engaging the screw threads of inner module (60) with the screw threads of housing (12).

Figure 7:
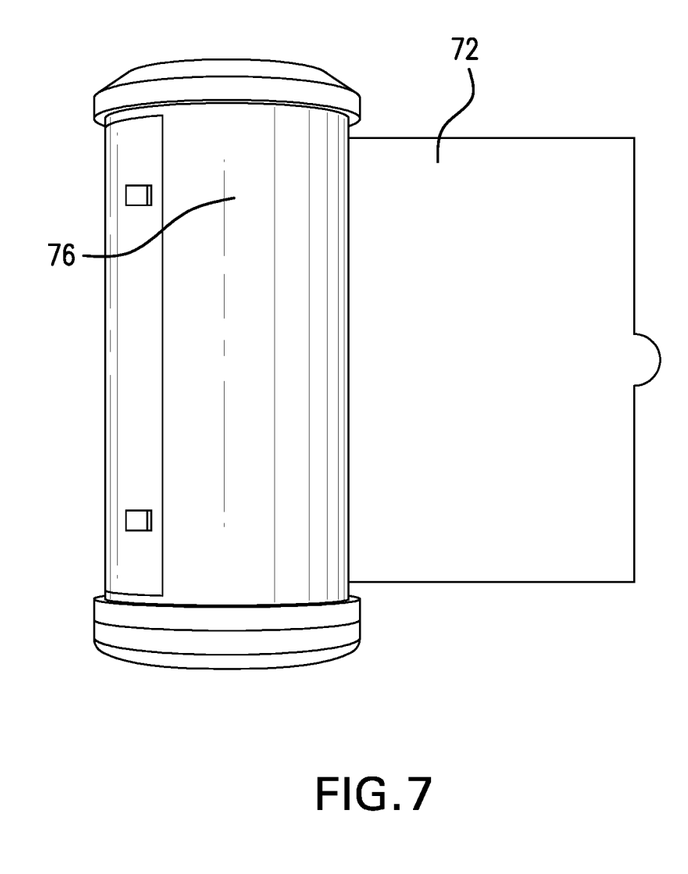
FIG. 7 depicts an inner module with a sheet rolled around a central post.

As shown in FIG. 7, inner module (60) may have a sheet of flexible material (72) wound around at least a center post (76) of the tube. The sheet of material may be longer than the circumference of the catch tube, and may be unrolled to expose more of the sheet. One or more of the pillars (50) or (52) may include ridges or edges that may be used to facilitate tearing sheet (72).

Sheet (72) may be coated with insect control material. The insect control material may be an insect attractant or an insect repellant. The insect control material may include, instead or in addition, an adhesive material capable of binding to the sheet insects that land on the sheet. The insect control material may comprise a mix of ammonia, L-lactic acid, tetradecanoic acid, 3-methyl-1-butanol and 1-butylamine. The insect control material may further include octanol.

In the alternative, the insect control material may be applied directly to the surface of the inner module (60). In that embodiment, inner module (60) would preferably have an absorbent surface to hold the insect control material.

Figure 8A:
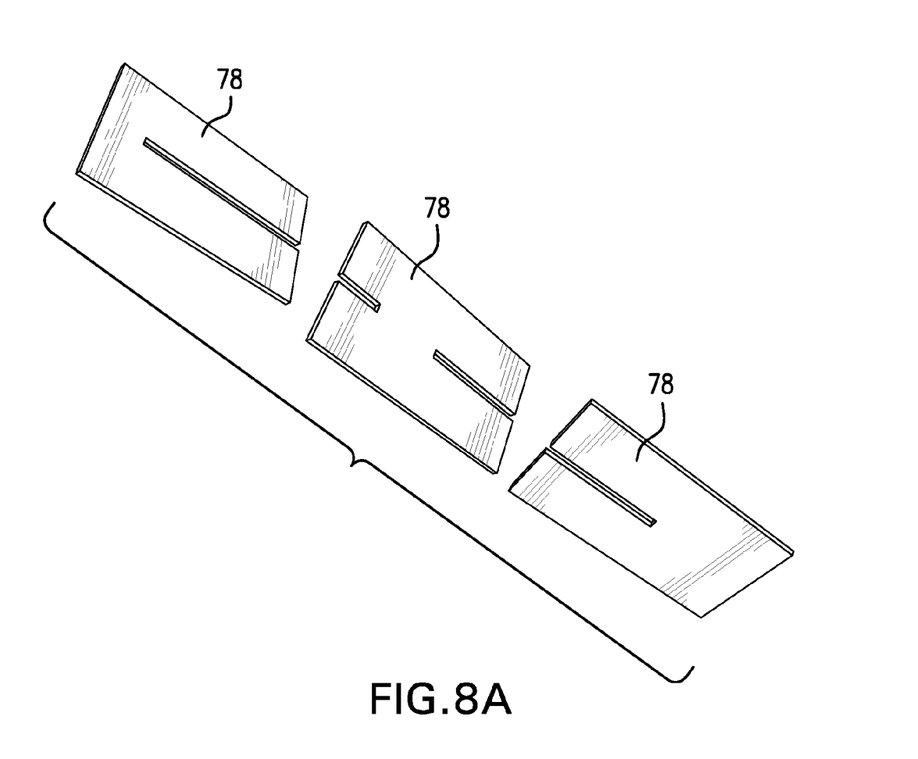
FIGS. 8A and 8B depict cards that form the center portion of an inner module.
Figure 8B:
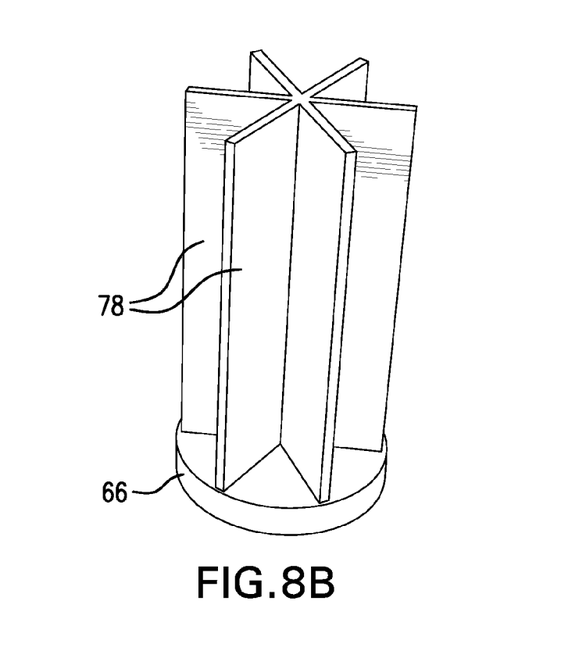
Figure 9A:
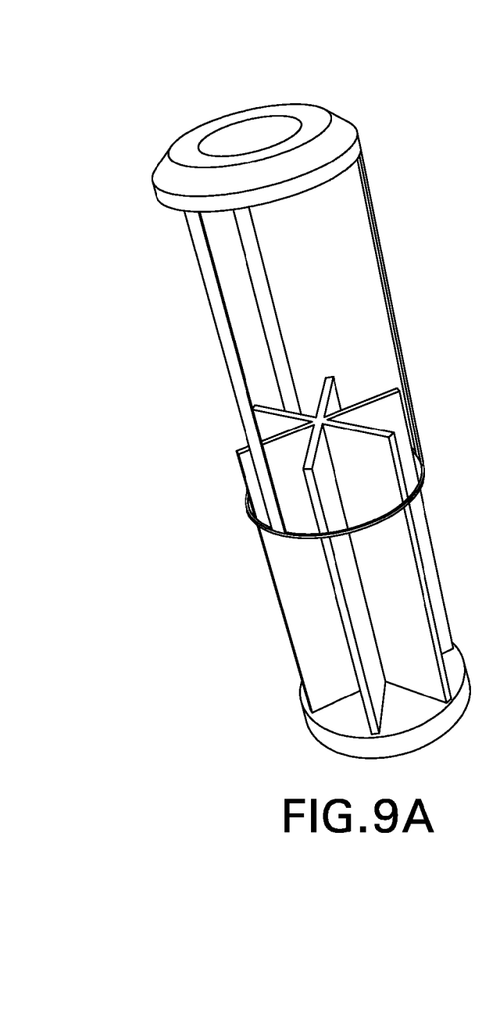
FIGS. 9A-9C depict the formation of an inner module having cards as the center portion.
Figure 9B:
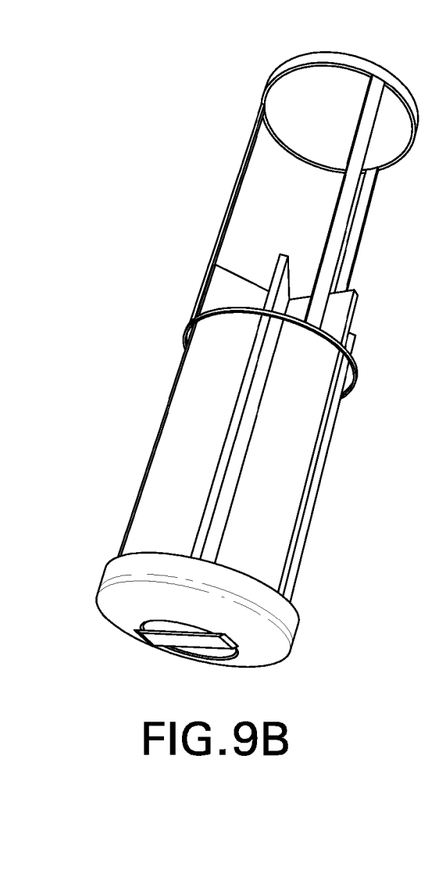
Figure 9C:
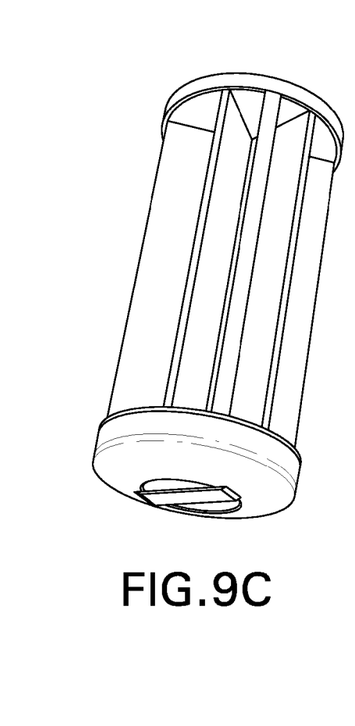

As shown in FIGS. 8A-8B, the center portion of inner module (60) may consist of one or more interlocking cards (78). Preferably, inner module would include two to four cards (78). Three cards (78) are shown in FIGS. 8A-8B. FIG. 8B shows the three cards (78) from FIG. 8A assembled as the center portion of inner module (60). The cards (78) may be coated with insect control material. The cards (78) may be connected to proximal end (62) and distal end (66) of inner module (60) by an adhesive, or by inserting the ends of cards (78) into corresponding recesses in the inner facing surfaces of proximal end (62) and distal end (66). As shown in FIGS. 9A-9C, inner module (60) may include pillars (82) from proximal end (62) to distal end (66) that, for example, provide rigidity to inner module (60), help facilitate insertion of inner module (60) into housing (12), and help prevent inadvertent contact with cards (78).

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. Further, it will be apparent to those of skill in the art that numerous changes may be made in such details without departing from the spirit and the principles of the invention. It should be appreciated that the invention is capable of being embodied in other forms without departing from its essential characteristics.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

It should be appreciated that the invention is capable of being embodied in other forms without departing from its essential characteristics.

What is claimed is:

1. A lighting device comprising:
a housing having a first end and a second end, said first end connected to said second end with a plurality of pillars, said first end comprising a first magnet and a connector capable of mating with a light socket, said second end having a circular aperture;
one or more light sources electrically connected to the connector;
an inner module comprising a proximal end and a distal end, said proximal end capable of being inserted through the aperture and having a second magnet capable of magnetically joining to the first magnet;
wherein said circular aperture has a first radius, the plurality of pillars is arranged circumferentially around the aperture at a second radius, and the second radius is larger than the first radius.

2. The lighting device of claim 1 wherein the inner module further comprises a post connecting the proximal end to the distal end and a sheet of material surrounding at least a portion of the post, said sheet of material coated with one or more insect control chemicals.

3. The lighting device of claim 2 wherein the insect control chemicals comprise an insect attractant and an adhesive.

4. The lighting device of claim 3 wherein said connector is an E27 lightbulb screw base.

5. The lighting device of claim 3 wherein at least one of said one or more light source is capable of emitting infrared light.

6. The lighting device of claim 3 wherein at least one light source is capable of emitting ultraviolet light.

7. The lighting device of claim 3 further comprising one or more circuit boards electrically connected to the connector and said one or more light sources, said one or more circuit boards capable of controlling the illumination of said one or more light sources.

8. The lighting device of claim 1 wherein the distal end of the inner module is circular.

9. The lighting device of claim 1 wherein the inner module further comprises a plurality of cards, said cards coated with one or more insect control chemicals.

10. The lighting device of claim 9 wherein the insect control chemicals comprise an insect attractant and an adhesive.

11. The lighting device of claim 10 wherein said connector is an E27 lightbulb screw base.

12. The lighting device of claim 10 wherein at least one light source is capable of emitting infrared light.

13. The lighting device of claim 10 wherein at least one light source is capable of emitting ultraviolet light.

14. The lighting device of claim 10 further comprising one or more circuit boards electrically connected to the connector and said one or more light sources, said one or more circuit boards capable of controlling the illumination of said one or more light sources.

* * * * *